US010797513B1

(12) United States Patent
Oudrhiri et al.

(10) Patent No.: US 10,797,513 B1
(45) Date of Patent: Oct. 6, 2020

(54) TECHNOLOGIES FOR INTERACTIVE PREDICTIVE CONTROL OF UNINTERRUPTIBLE POWER SUPPLY SYSTEMS

(71) Applicant: ABB Schweiz AG, Baden (CH)

(72) Inventors: Adil Oudrhiri, Richmond, VA (US); Christopher Alan Belcastro, Mechanicsville, VA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/377,863

(22) Filed: Apr. 8, 2019

(51) Int. Cl.
*H02J 9/06* (2006.01)
*H02M 5/293* (2006.01)

(52) U.S. Cl.
CPC .............. *H02J 9/06* (2013.01); *H02M 5/293* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,910,892 | A * | 6/1999 | Lyons | H02M 7/487 363/132 |
| 6,266,260 | B1 * | 7/2001 | Zahrte, Sr. | H02J 9/062 363/132 |
| 2006/0171182 | A1 * | 8/2006 | Siri | H02M 3/33592 363/131 |
| 2007/0114985 | A1 * | 5/2007 | Latham | H02M 3/157 323/283 |
| 2008/0252280 | A1 * | 10/2008 | Prodic | H03K 7/08 323/283 |
| 2009/0027025 | A1 * | 1/2009 | Latham | H02M 3/157 323/283 |

(Continued)

FOREIGN PATENT DOCUMENTS

| | | |
|---|---|---|
| CN | 204205707 U | 3/2015 |
| WO | 20010013491 A1 | 2/2001 |

OTHER PUBLICATIONS

Cavanini et al., "Model predictive control for pre-compensated voltage mode controlled DC-DC converters", IET Control Theory Appl., 2017, vol. 11 Iss. 15, pp. 2514-2520.

(Continued)

*Primary Examiner* — Adam D Houston
(74) *Attorney, Agent, or Firm* — Barnes & Thornburg LLP

(57) ABSTRACT

Technologies for interactive predictive control of uninterruptible power supply systems are disclosed. In an illustrative embodiment, a method of controlling a double-conversion uninterruptible power supply (UPS) system may include defining, with a digital signal processor (DSP), a curve as a function of a plurality of user-input reference points associated with an inductor coupled to either an input or an output of the double-conversion UPS system, where the curve is indicative of an electromagnetic behavior of the inductor. The method may also include determining, with the DSP, in response to an application of current to the inductor, an inductance value for the inductor based on the defined curve and the applied current. The method may further include setting, with the DSP, as a function of the determined inductance value, a duty cycle to control switching of at least one of an active rectifier and an inverter of the double-conversion UPS system.

20 Claims, 4 Drawing Sheets

(56) References Cited

U.S. PATENT DOCUMENTS

| | | | |
|---|---|---|---|
| 2013/0015704 A1 | 1/2013 | Tsai et al. | |
| 2013/0249319 A1* | 9/2013 | Cummings | H02J 1/102 |
| | | | 307/131 |
| 2015/0097602 A1* | 4/2015 | Walraven | H03L 7/095 |
| | | | 327/154 |
| 2015/0146458 A1* | 5/2015 | Lim | H02M 3/158 |
| | | | 363/44 |
| 2015/0177808 A1* | 6/2015 | Sarti | G06F 1/30 |
| | | | 713/300 |
| 2018/0279429 A1* | 9/2018 | Sadwick | H05B 33/08 |
| 2019/0098723 A1* | 3/2019 | Sadwick | H05B 47/175 |
| 2020/0036221 A1* | 1/2020 | Vihersalo | H02H 7/22 |

OTHER PUBLICATIONS

Pratap et al., "Model Predictive Control of PV System With Quasi-Z-Source Foru-Leg Inverter", International Journal of Professional Engineering Studies, vol. VIII/Issue 4/ Apr. 2017, pp. 21-.
International Search Report for PCT/US2020/027206, dated Jun. 18, 2020, 5 pages.

\* cited by examiner

TECHNOLOGIES FOR INTERACTIVE PREDICTIVE CONTROL OF UNINTERRUPTIBLE POWER SUPPLY SYSTEMS

TECHNICAL FIELD

The present disclosure relates, generally, to uninterruptible power supply systems and, more particularly, to technologies for interactive predictive control of uninterruptible power supply systems.

BACKGROUND

An uninterruptible power supply (UPS) provides emergency power to a load during a power failure event, such as when an input power source fails. Power systems may include a UPS to ensure that power is continuously supplied to one or more critical loads. Indeed, a UPS may be deployed in a variety of applications, such as in utility substations, industrial plants, data centers, marine systems, and the like.

Variation in magnetic materials used in a UPS system (e.g., in the input and/or output filters of the system) can result in substantial control challenges for the UPS system, particularly where the system must operate over a wide range of loads. By way of example, FIG. 1 illustrates a step response of an inductor current in an active front-end rectifier of a double-conversion UPS system of the prior art under changing load conditions. The instability resulting from this inductance versus load dependency in prior art UPS systems can cause the quality of converted power supplied by the UPS system to deteriorate significantly.

Prior art UPS systems have attempted to address this problem in several ways, none of which is optimal. Some systems employ loosened power quality tolerances to account for load step events such as those represented in FIG. 1. Other systems have gated the load to bypass power conversion during faults or load steps like those in FIG. 1. Still other systems have attempted to address inductance versus load dependency using static look-up tables in the embedded controls of the UPS system. While this last approach yields better results and improves performance, it requires extensive computational time, adding latency, and large amounts of expensive nonvolatile memory.

SUMMARY

According to one aspect, a double-conversion uninterruptible power supply (UPS) system may comprise an active rectifier having an input and an output, an inverter having an input and an output, the input of the inverter being coupled to the output of the active rectifier, an inductor coupled to either the input of the active rectifier or the output of the inverter, and a digital signal processor coupled with the inductor. The digital signal processor may (i) define a curve as a function of a plurality of user-input reference points associated with the inductor, wherein the curve is indicative of an electromagnetic behavior of the inductor, (ii) determine, in response to an application of current to the inductor, an inductance value for the inductor based on the defined curve and the applied current, and (iii) set, as a function of the determined inductance value, a duty cycle to control switching of at least one of the active rectifier and the inverter.

In some embodiments, the digital signal processor may execute a predictive control scheme that periodically (i) re-determines the inductance value for the inductor based on the defined curve and the applied current and (ii) re-sets the duty cycle as a function of the re-determined inductance value for the inductor.

In some embodiments, the double-conversion UPS system may further comprise a graphical user interface. The graphical user interface may receive the plurality of user-input reference points, each reference point including a field intensity value and a corresponding magnetic density value, and transmit the plurality of user-input reference points to the digital signal processor.

In some embodiments, the digital signal processor may (i) determine, in response to the application of current to the inductor, a permeability value from the defined curve and (ii) determine the inductance value for the inductor based on the determined permeability value, an area of a magnetic core of the inductor, and a length of the magnetic core of the inductor. The duty cycle may also be set as a function of a sample of the applied current, a sampling frequency, a bus voltage, and an alternating current voltage.

In some embodiments, the inductor may be an input filter inductor coupled to the input of the active rectifier. In some embodiments, the inductor may be an output filter inductor coupled to the output of the inverter.

According to another aspect, a method of controlling a double-conversion uninterruptible power supply (UPS) system, the method may comprise defining, with a processor, a curve as a function of a plurality of user-input reference points associated with an inductor coupled to either an input or an output of the double-conversion UPS system, wherein the curve is indicative of an electromagnetic behavior of the inductor. The method may also comprise determining, with the processor, in response to an application of current to the inductor, an inductance value for the inductor based on the defined curve and the applied current. The method may further comprise setting, with the processor, as a function of the determined inductance value, a duty cycle to control switching of at least one of an active rectifier and an inverter of the double-conversion UPS system.

In some embodiments, the processor may execute a predictive control scheme that periodically (i) re-determines the inductance value for the inductor based on the defined curve and the applied current and (ii) re-sets the duty cycle as a function of the re-determined inductance value for the inductor.

In some embodiments, the method may further comprise receiving, with the processor from a graphical user interface, the plurality of user-input reference points, each reference point including a field intensity value and a corresponding magnetic density value.

In some embodiments, the method may further comprise determining, with the processor, in response to the application of current to the inductor, a permeability value from the defined curve, and determining, with the processor, the inductance value for the inductor based on the determined permeability value, an area of a magnetic core of the inductor, and a length of the magnetic core of the inductor. The duty cycle may also be set as a function of a sample of the applied current, a sampling frequency, a bus voltage, and an alternating current voltage.

In some embodiments, the inductor may be an input filter inductor coupled to an input of the rectifier. In some embodiments, the inductor may be an output filter inductor coupled to an output of the inverter. The processor may be at least one of a digital signal processor, a field-programmable gate array, and a microcontroller.

According to yet another aspect, one or more machine-readable storage media may store a plurality of instructions that, when executed, cause a processor coupled to a double-conversion uninterruptible power supply (UPS) system to define a curve as a function of a plurality of user-input reference points associated with an inductor coupled to either an input or an output of the double-conversion UPS system, wherein the curve is indicative of an electromagnetic behavior of the inductor, to determine, in response to an application of current to the inductor, an inductance value for the inductor based on the defined curve and the applied current, and to set, as a function of the determined inductance value, a duty cycle to control switching of at least one of an active rectifier and an inverter of the double-conversion UPS system.

In some embodiments, execution of the plurality of instructions may further cause the processor to execute a predictive control scheme that periodically (i) re-determines the inductance value for the inductor based on the defined curve and the applied current and (ii) re-sets the duty cycle as a function of the re-determined inductance value for the inductor.

In some embodiments, execution of the plurality of instructions may further cause the processor to obtain the plurality of user-input references points from a graphical user interface, wherein each reference point including a field intensity value and a corresponding magnetic density value.

In some embodiments, execution of the plurality of instructions may further cause the processor to determine, in response to the application of current to the inductor, a permeability value from the defined curve, and to determine the inductance value based on the determined permeability value, an area of a magnetic core of the inductor, and a length of the magnetic core of the inductor.

In some embodiments, execution of the plurality of instructions may further cause the processor to set the duty cycle as a function of a sample of the applied current, a sampling frequency, a bus voltage, and an alternating current voltage.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description refers to the following figures, in which.

DETAILED DESCRIPTION OF THE DRAWINGS

Figure 1:
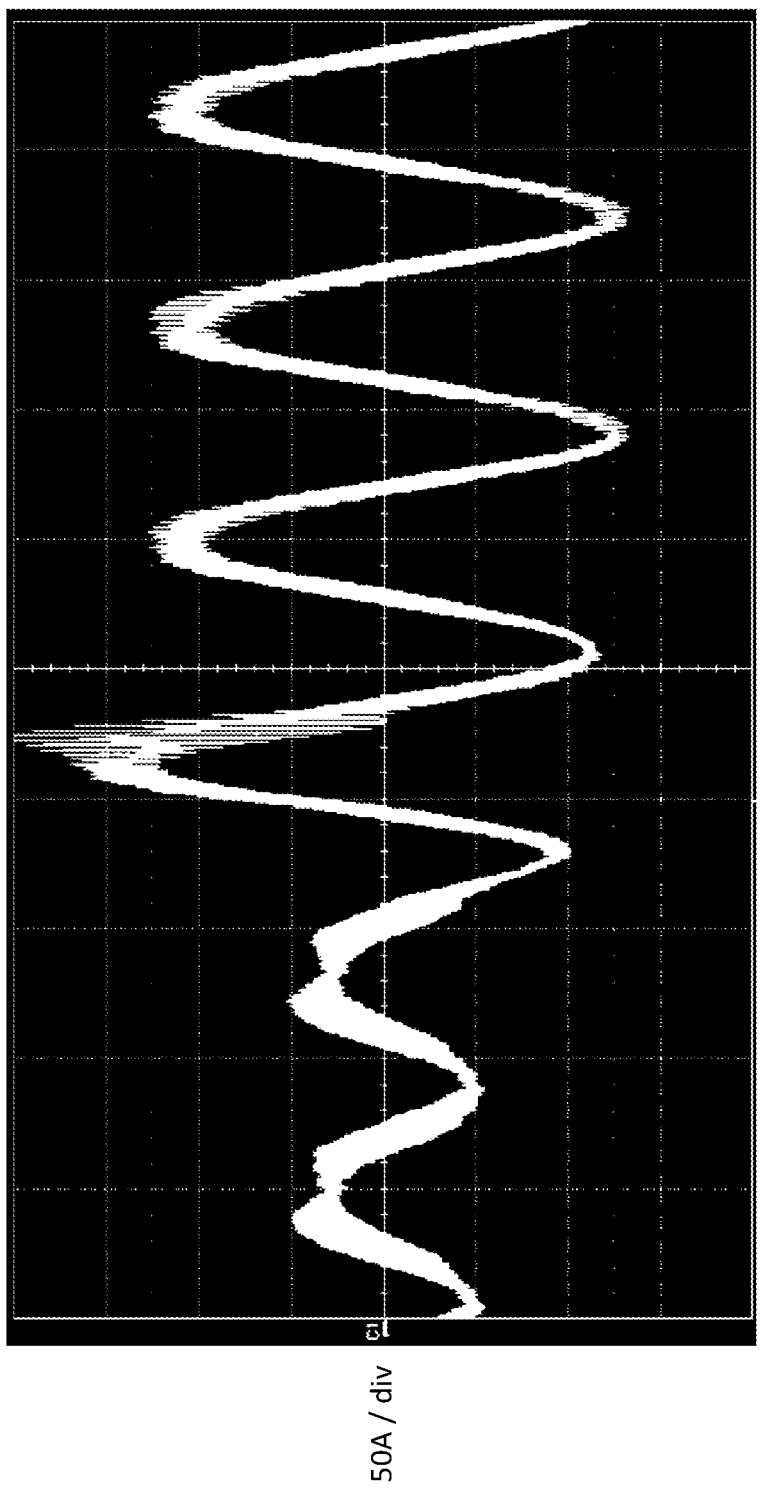
FIG. 1 is an example of a step response of an inductor current of a UPS system according to the prior art.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The present disclosure provides technologies for interactive predictive control of uninterruptible power supply (UPS) systems. In particular, interactive systems and methods are disclosed that determine real-time inductance values for the magnetics used in a UPS system and use that information in dynamic predictive control schemes to avoid instability issues that can result from load steps or faults. As discussed in detail below, the presently disclosed systems and methods utilize user-input reference points to define curves indicative of the electromagnetic behavior of one or more inductors used in the UPS system. Real-time inductance values for the inductors of the UPS system are then determined, based upon these defined curves together with sampled inductor currents, and used to set duty cycles for controlling switching of active devices in the UPS system. In this manner, current oscillations like those shown in FIG. 1 may be avoided. As such, in contrast to prior approaches, the designer of the UPS system is not forced to choose between staying in double conversion and sacrificing power quality or gating on bypass (neither of which is optimal). The presently disclosed systems and methods also provide significant advantages with regard to serviceability. By way of example, when a new inductor is incorporated into the UPS system (e.g., replacing an old inductor during service), the presently disclosed systems and methods allow the new inductor to be characterized simply by user input of new set of reference points associated with that inductor. Unlike prior approaches, there is no need to develop and deploy new, complex look-up tables or other control software, avoiding risks to customer loads that occur during such an upgrade process.

Figure 2:
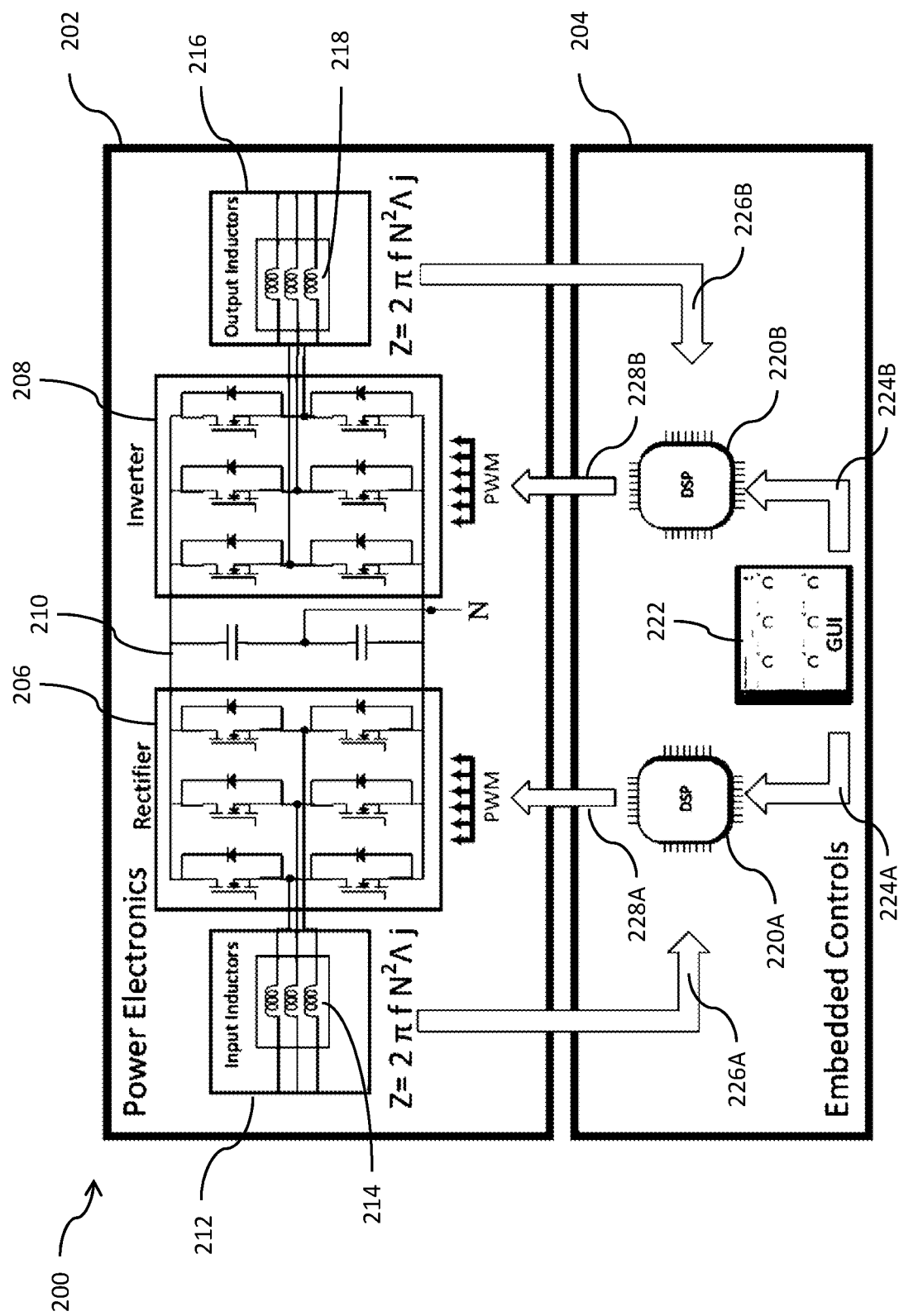
FIG. 2 is a simplified block diagram of at least one embodiment of a double-conversion UPS system according to the present disclosure.

Referring now to FIG. 2, one illustrative embodiment of a double-conversion UPS system 200 according to the present disclosure is shown. The UPS system 200 includes power electronics 202 and embedded controls 204, both of which are further discussed below. Of course, the UPS systems 200 disclosed herein may be adapted to a variety of settings, such as an industrial plant, utility substation, telecommunications center, and so on. As such, in various embodiments, the UPS system 200 may include additional, fewer, or alternative components, including those described elsewhere herein, as compared to the components illustrated in FIG. 2. By way of example, while the illustrative UPS system 200 is embodied as a three-phase system, the present disclosure may readily be applied to single-phase systems.

The power electronics 202 of the UPS system 200 include an active rectifier 206 and an inverter 208. An input of the inverter 208 is coupled to an output of the active rectifier 206 via a direct current (DC) voltage bus 210. As will be appreciated by those skilled in the art, during operation, the rectifier 206 functions to convert alternating current (AC) voltage received at its input into DC voltage (provided at its output), while the inverter 208 functions to convert DC voltage received at its input into AC voltage (provided at its output). As shown in FIG. 2, the rectifier 206 and the inverter 208 each include a plurality of active devices (e.g., transistors) that are switched on and off in a controlled manner to perform these power conversion functions. It is contemplated that, in some embodiments, some or all of the active devices of the rectifier 206 and the inverter 208 may employ wide bandgap semiconductors to achieve higher efficiency, due to the stable operation of the presently disclosed systems and methods. As suggested in FIG. 2, the switching of the active devices of the rectifier 206 and the inverter 208 is controlled by pulse-width modulated signals sent to the gate terminals of the active devices or to intermediate gate driver circuits (not shown).

The power electronics 202 of the UPS system 200 further include an input filter 212 (e.g., an LCL filter) and an output filter 216 (e.g., an LC filter). As shown in FIG. 2, the input filter 212 is coupled to an input of the active rectifier 206, while the output filter 216 is coupled to an output of the inverter 208. The input filter 212 includes a number of inductors 214, as well as other components not shown for clarity. In the illustrative embodiment, the input filter 212 includes at least one inductor 214 corresponding to each of the three phases handled by the UPS system 200. As such, each of the inductors 214 is coupled to an input of the active rectifier 206. Similar to the input filter 212, the output filter 216 includes a number of inductors 218, as well as other components not shown for clarity. In the illustrative embodiment, the output filter 216 includes at least one inductor 218 corresponding to each of the three phases handled by the UPS system 200. As such, each of the inductors 218 is coupled to an output of the inverter 208. As suggested in FIG. 2, each of the inductors 214, 218 has an impedance (Z) that can be characterized by the equation $Z=2\pi f N^2 A j$, where f is frequency, N is a number of turns of that inductor 214, 218, A is a permanence of that inductor 214, 218, and is the square root of −1.

The embedded controls 204 of the UPS system 200 illustratively include a number of digital signal processors 220. The DSPs 220 may alternatively be embodied as any type of processor capable of performing the functions described herein (such as, for example, single or multi-core processor(s), single or multi-socket processor(s), microcontroller(s), field-programmable gate arrays (FPGAs) (including floating point FPGAs), or other processor(s) and/or processing/controlling circuit(s)). The DSPs 220 may each include or be communicatively coupled to one or more memories (not shown), which may be embodied as any type of volatile or non-volatile memory or data storage capable of storing data (e.g., user-input reference points) for use by the DSP 220. While two DSPs 220 are illustratively shown in FIG. 2, it is contemplated that the UPS system 200 may utilize any number of DSPs 220 as is necessary or desirable for monitoring and controlling the power electronics 202 of the UPS system 200. For instance, in some embodiments, the UPS system 200 may include a single DSP 220 that performs all monitoring and control functions of the UPS system 200. In other embodiments, such as that shown in FIG. 2, the UPS system 200 may include two DSPs 220 working together to control the UPS system 200: one DSP 220A monitors and controls the operation of the input filter 212 and the active rectifier 206, while another DSP 220B monitors and controls the operation of the inverter 208 and the output filter 216. In still other embodiments, each phase leg (or even each active device) of the rectifier 206 and the inverter 208 may have a separate DSP 220 dedicated to control of that leg (or device).

As shown in FIG. 2, the embedded controls 204 of the UPS system 200 also includes an interface 222, specifically, a Graphical User Interface (GUI) 222, for interaction with one or more users of the UPS system 200. The GUI 222 is operable to receive user inputs to be used in control of the UPS system 200. By way of example, the GUI 222 can receive user-input reference points characterizing the inductors 214, 218 (as further discussed below). In some embodiments, the interface 222 may also be operable to receive inputs (such as reference points characterizing the inductors 214, 218) directly from third-party data sources. Data ingested in this manner is still considered "user-input" for purposes of the present disclosure. In the illustrative embodiment, the GUI 222 is also operable to present information concerning the configuration and/or operation of the UPS system 200 to one or more users.

Inputs received by the interface 222 may be transmitted to and received by the DSPs 220 via a number of signal paths 224. For instance, as shown in FIG. 2, the GUI 222 may transmit user-input data to DSP 220A via signal path 224A and may transmit user-input data to DSP 220B via signal path 224B. Each DSP 220 may monitor operation of any number of various components of the power electronics 202 via signal paths 226. For instance, in the illustrative embodiment, the DSP 220A receives samples of the current applied to each inductor 214 via one or more signal paths 226A. Similarly, in the illustrative embodiment, the DSP 220B receives samples of the current applied to each inductor 218 via one or more signal paths 226B. Each DSP 220 may also transmit one or more control signals to components of the power electronics 202 via signal paths 228. In the illustrative embodiment, the DSP 220A transmits control signals via the signals paths 228A that control switching of active devices in the rectifier 206, while the DSP 220B transmits control signals via the signals paths 228B that control switching of active devices in the inverter 208. These control signals may be illustratively embodied as pulse width modulation (PWM) signals or may be used to set or adjust the duty cycles of PWM signals generated by the power electronics 202 of the UPS system 200. Each of the signal paths 224, 226, 228 may be embodied as any type of connection for communication signals and/or data from one point to another, such as a wire, a trace, a bus, or the like.

Figure 3:
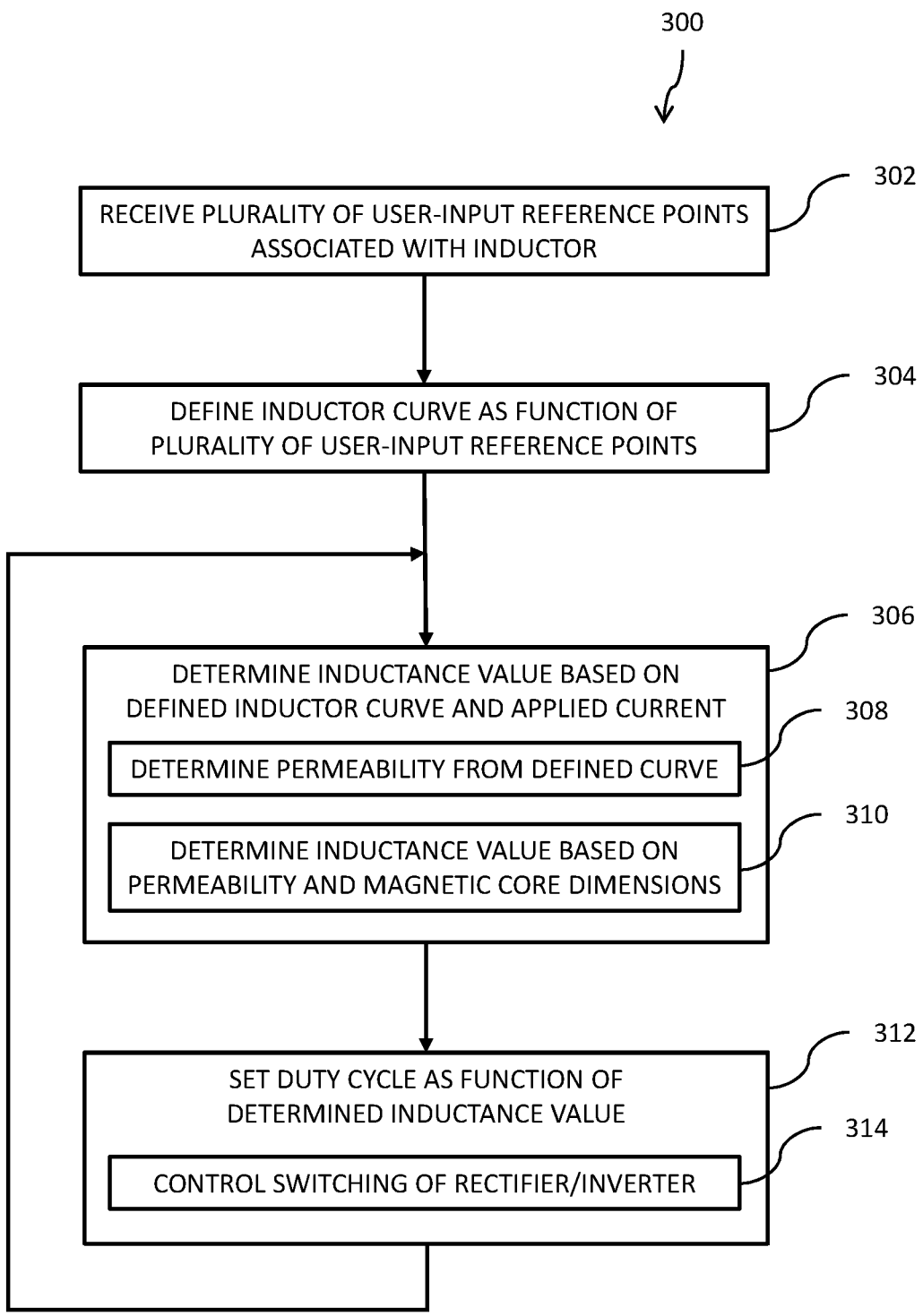
FIG. 3 is a simplified flow diagram of at least one embodiment of a method for interactive predictive control of the double-conversion UPS system of FIG. 2 according to the present disclosure.
Figure 4:
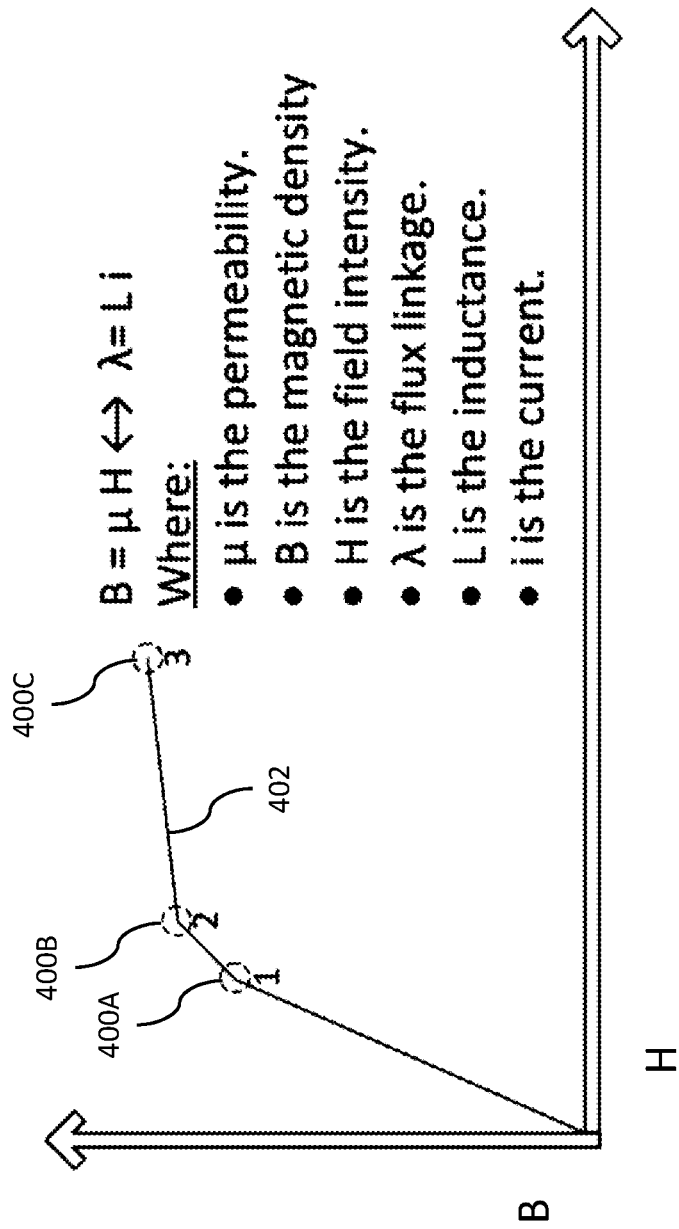
FIG. 4 is a diagram illustrating three user-input reference points defining a BH curve indicative of electromagnetic behavior of an inductor of the double-conversion UPS system of FIG. 2.

Referring now to FIG. 3, in operation, each of the DSPs 220 may perform a method 300 for controlling the UPS system 200. The method 300 begins with block 302, in which the DSP 220 receives a plurality of user-input reference points 400 associated with one of the inductors 214, 218 of the UPS system 200. In the illustrative embodiment, block 302 involves the DSP 220 receiving at least three reference points 400 from the GUI 222 (via one or more of the signal paths 224), after a user has input those reference points 400 into the GUI 222. The reference points 400 received in block 302 are stored by the DSP 220 for use in its predictive control scheme (further discussed below), until new reference points 400 are received from the GUI 222 at a later time (e.g., when one of the inductors 214, 218 is replaced). In the illustrative embodiment, the user-input reference points 400 each take the form of a data pair including a field intensity value (H) and a corresponding magnetic density value (B). One example of a set of three such user-input reference points 400A, 400B, 400C is shown in FIG. 4. A user may obtain the reference points 400 associated with a particular inductor 214, 218 of the UPS system 200 from the manufacturer of that inductor 214, 218 (e.g., on a datasheet), through testing of the inductor 214, 218, or by monitoring performance of the inductor 214, 218, by way of example.

After block 302, the method 300 proceeds to block 304, in which the DSP 220 defines a curve 402 as a function of the user-input reference points 400 associated with a particular inductor 214, 218 that were received in block 302. The curve 402 generated in block 304 is indicative of an electromagnetic behavior of the inductor 214, 218 associated with the reference points 400 used to generate that curve 402. One example of such a curve 402 is illustrated in FIG. 4. As shown in that diagram, a BH curve 402 characterizing one of the inductors 214, 218 is defined using three user-input (B, H) reference points 400A, 400B, 400C. Block 302 is repeated for each of the inductors 214, 218 to be included in the control scheme to be executed by the DSP 220, so as to generated a curve 402 indicative of the electromagnetic behavior of each such inductor 214, 218.

After block 304, the method 300 proceeds to block 306, in which the DSP 220 determines a current-dependent inductance value for each inductor 214, 218 included in the control scheme executed by that DSP 220. Block 306 is performed in response to and based upon the application of current to the inductors 214, 218. As discussed above, the UPS system 200 may include circuitry for sampling the current applied to each of the inductors 214, 218. Sampled current values of interest are transmitted to the DSP 220 via the signal paths 226. During block 306, the DSP 220 uses these sampled currents and the curve 402 (defined in block 304) to determine a real-time inductance value for each inductor 214, 218 of interest. In some embodiments of method 300, block 306 may involve the DSP 220 determining a permeability value (µ) for the inductor 214, 218 from the defined curve 402, as indicated by block 308. In particular, the permeability value (µ) may be computed as µ=B/H for the applied current. In some embodiments of method 300, block 306 may also involve block 310, in which the DSP 220 determines the inductance value (L) for the inductor 214, 218 using the permeability value (µ) determined in block 308, an area of a magnetic core of the inductor 214, 218, and a length of the magnetic core of the inductor 214, 218 (these magnetic core dimensions may be input by a user and received in block 302, along with the reference points 400). In particular, in block 310, the inductance value may be computed as L=µA/l for the applied current (where A and l are the magnetic core area and length, respectively).

After block 306, the method 300 proceeds to block 312, in which the DSP 220 sets a duty cycle to control switching of the active rectifier 206 and/or the inverter 208. Block 312 may involve the DSP 220 transmiting one or more control signals to components of the power electronics 202 via signal paths 228. As discussed above, these control signals may be illustratively embodied as pulse width modulation (PWM) signals or may be used to set or adjust the duty cycles of PWM signals generated by the power electronics 202 (e.g., by gate driver circuits). In block 312, the DSP 220 sets the duty cycle as a function of the inductance value (L) determined in block 306. In some embodiments, the DSP 220 may set the duty cycle as a function of this inductance value (L), a sample of the current applied to the inductor 214, 218, a sampling frequency, a voltage on bus 210, and an alternating current voltage applied to the inductor 214, 218. For instance, the DSP 220 may compute the duty cycle with the following equation:

$$d[n] = \frac{fsL(i)}{Vdc}(iREF[n-1] - iL[n-1] + 2Vac),$$

where d[n] is the duty cycle to be used during the present sample n, fs is the sampling frequency, L(i) is the determined inductance value from block 306, Vdc is the DC voltage on bus 210, iREF[n−1] is a reference current during the last sample [n−1], iL[n−1] is the last sample of the inductor current, and Vac is the AC voltage applied to the inductor 214, 218. Block 312 also involves block 314, in which the active devices of the rectifier 206 and/or inverter 208 are controlled using the duty cycle set by the DSP 220 in block 312.

After block 312, the method 300 loops back to block 306, such that the DSP 220 periodically re-determines the inductance value (L) for the inductor 214, 218 based on the defined curve 402 and the applied current (block 306) and then re-sets the duty cycle as a function of the re-determined inductance value for the inductor 214, 218 (block 312). In the illustrative embodiment, the DSP 220 executes a predictive control scheme in which it performs blocks 306 and 312 each time the current applied to the inductor 214, 218 is sampled. In this way, the DSP 220 is constantly updating its model with the real-time inductance values the inductors 214, 218, allowing the UPS system 200 to avoid unwanted current oscillations in response to load steps or faults.

At the user's discretion and direction, the method 300 may return to block 302, in which the DSP 220 may receive new user-input reference points 400 for one or more of the inductors 214, 218 of the UPS system 200. For instance, a user may input new reference points 400 into the GUI 222 due to replacing one or more of the inductors 214, 218 of the UPS system 200 with new components having new electromagnetic behavior(s). As another example, the user may decide to adjust previously-entered reference points 400 for an existing inductor 214, 218, in order to achieve better performance of the UPS system 200. In such cases, the method 300 will perform blocks 302 and 304 to recommission the UPS system 200. After receiving new user-input reference points 400 in block 302, the DSP 220 will define a new curve 402 in block 304. The DSP 220 will then utilize this new curve 402 in blocks 306 and 312 for control of the UPS system 200. In this manner, the predictive control scheme of the UPS system 200 can be easily maintained and tuned, without the costly, time-consuming, and risky software updates required by prior art systems.

The invention claimed is:

1. A double-conversion uninterruptible power supply (UPS) system comprising:
    an active rectifier having an input and an output;
    an inverter having an input and an output, the input of the inverter being coupled to the output of the active rectifier;
    an inductor coupled to either the input of the active rectifier or the output of the inverter; and
    a digital signal processor coupled with the inductor to:
        define a curve as a function of a plurality of user-input reference points associated with the inductor, wherein the curve is indicative of an electromagnetic behavior of the inductor,
        determine, in response to an application of current to the inductor, an inductance value for the inductor based on the defined curve and the applied current, and
        set, as a function of the determined inductance value, a duty cycle to control switching of at least one of the active rectifier and the inverter.

2. The double-conversion UPS system of claim 1, wherein the digital signal processor is to execute a predictive control scheme that periodically (i) re-determines the inductance value for the inductor based on the defined curve and the applied current and (ii) re-sets the duty cycle as a function of the re-determined inductance value for the inductor.

3. The double-conversion UPS system of claim 1, further comprising a graphical user interface to:
    receive the plurality of user-input reference points, each reference point including a field intensity value and a corresponding magnetic density value; and
    transmit the plurality of user-input reference points to the digital signal processor.

4. The double-conversion UPS system of claim 1, wherein the digital signal processor is further to (i) determine, in response to the application of current to the inductor, a permeability value from the defined curve and (ii) determine the inductance value for the inductor based on the determined permeability value, an area of a magnetic core of the inductor, and a length of the magnetic core of the inductor.

5. The double-conversion UPS system of claim 4, wherein the duty cycle is further set as a function of a sample of the applied current, a sampling frequency, a bus voltage, and an alternating current voltage.

6. The double-conversion UPS system of claim 1, wherein the inductor is an input filter inductor coupled to the input of the active rectifier.

7. The double-conversion UPS system of claim 1, wherein the inductor is an output filter inductor coupled to the output of the inverter.

8. A method of controlling a double-conversion uninterruptible power supply (UPS) system, the method comprising:
    defining, with a processor, a curve as a function of a plurality of user-input reference points associated with an inductor coupled to either an input or an output of the double-conversion UPS system, wherein the curve is indicative of an electromagnetic behavior of the inductor;
    determining, with the processor, in response to an application of current to the inductor, an inductance value for the inductor based on the defined curve and the applied current; and
    setting, with the processor, as a function of the determined inductance value, a duty cycle to control switching of at least one of an active rectifier and an inverter of the double-conversion UPS system.

9. The method of claim 8, wherein the processor executes a predictive control scheme that periodically (i) re-determines the inductance value for the inductor based on the defined curve and the applied current and (ii) re-sets the duty cycle as a function of the re-determined inductance value for the inductor.

10. The method of claim 8, further comprising receiving, with the processor from a graphical user interface, the plurality of user-input reference points, each reference point including a field intensity value and a corresponding magnetic density value.

11. The method of claim 8, further comprising:
    determining, with the processor, in response to the application of current to the inductor, a permeability value from the defined curve; and
    determining, with the processor, the inductance value for the inductor based on the determined permeability value, an area of a magnetic core of the inductor, and a length of the magnetic core of the inductor.

12. The method of claim 11, wherein the duty cycle is further set as a function of a sample of the applied current, a sampling frequency, a bus voltage, and an alternating current voltage.

13. The method of claim 8, wherein the inductor is an input filter inductor coupled to an input of the rectifier.

14. The method of claim 8, wherein the inductor is an output filter inductor coupled to an output of the inverter.

15. The method of claim 8, wherein the processor is at least one of a digital signal processor, a field-programmable gate array, and a microcontroller.

16. One or more machine-readable storage media storing a plurality of instructions that, when executed, cause a processor coupled to a double-conversion uninterruptible power supply (UPS) system to:
    define a curve as a function of a plurality of user-input reference points associated with an inductor coupled to either an input or an output of the double-conversion UPS system, wherein the curve is indicative of an electromagnetic behavior of the inductor;
    determine, in response to an application of current to the inductor, an inductance value for the inductor based on the defined curve and the applied current; and
    set, as a function of the determined inductance value, a duty cycle to control switching of at least one of an active rectifier and an inverter of the double-conversion UPS system.

17. The one or more machine-readable storage media of claim 16, wherein execution of the plurality of instructions further causes the processor to execute a predictive control scheme that periodically (i) re-determines the inductance value for the inductor based on the defined curve and the applied current and (ii) re-sets the duty cycle as a function of the re-determined inductance value for the inductor.

18. The one or more machine-readable storage media of claim 16, wherein execution of the plurality of instructions further causes the processor to obtain the plurality of user-input references points from a graphical user interface, wherein each reference point including a field intensity value and a corresponding magnetic density value.

19. The one or more machine-readable storage media of claim 16, wherein execution of the plurality of instructions further causes the processor to:
   determine, in response to the application of current to the inductor, a permeability value from the defined curve; and
   determine the inductance value based on the determined permeability value, an area of a magnetic core of the inductor, and a length of the magnetic core of the inductor.

20. The one or more machine-readable storage media of claim 19, wherein execution of the plurality of instructions further causes the processor to set the duty cycle as a function of a sample of the applied current, a sampling frequency, a bus voltage, and an alternating current voltage.

\* \* \* \* \*